US010860939B2

(12) United States Patent
Ryckbosch et al.

(10) Patent No.: US 10,860,939 B2
(45) Date of Patent: Dec. 8, 2020

(54) APPLICATION PERFORMANCE ANALYZER AND CORRESPONDING METHOD

(71) Applicant: New Relic, Inc., San Francisco, CA (US)

(72) Inventors: Frederick Ryckbosch, Sint-Amandsberg (BE); Stijn Polfliet, Sint-Pauwels (BE); Bart De Vylder, Lokeren (BE)

(73) Assignee: New Relic, Inc., San Francisco, CA (US)

( * ) Notice: Subject to any disclaimer, the term of this patent is extended or adjusted under 35 U.S.C. 154(b) by 0 days.

(21) Appl. No.: 16/408,345

(22) Filed: May 9, 2019

(65) Prior Publication Data

US 2019/0311278 A1 Oct. 10, 2019

Related U.S. Application Data

(63) Continuation of application No. 15/010,121, filed on Jan. 29, 2016, now Pat. No. 10,339,457.

(30) Foreign Application Priority Data

Feb. 2, 2015 (EP) .................................... 15153477

(51) Int. Cl.
*G06N 5/04* (2006.01)
*G06N 20/00* (2019.01)
(Continued)

(52) U.S. Cl.
CPC ......... *G06N 5/047* (2013.01); *G06F 11/0706* (2013.01); *G06F 11/079* (2013.01);
(Continued)

(58) Field of Classification Search
CPC .... G06N 5/047; G06N 20/00; G06F 11/0754; G06F 11/0706; G06F 11/079; G06F 11/3452; G06F 11/3409; G06F 2201/865
See application file for complete search history.

(56) References Cited

U.S. PATENT DOCUMENTS 7,437,611 B2 * 10/2008 Agarwal ............. G06F 11/0709
714/26
8,572,735 B2 10/2013 Ghosh et al.
(Continued)

FOREIGN PATENT DOCUMENTS

WO WO 2013/043170 A1 3/2013
WO WO 2014120207 8/2014

OTHER PUBLICATIONS

Kachirski, "Intrusion Detection Using Mobile Agents in Wireless Ad Hoc Networks ", IEEE, 2003 (Year: 2003).*
(Continued)

*Primary Examiner* — Vincent Gonzales
*Assistant Examiner* — Imad Kassim
(74) *Attorney, Agent, or Firm* — Fenwick & West LLP

(57) ABSTRACT

An application performance analyzer adapted to analyze the performance of one or more applications running on IT infrastructure, comprises: a data collection engine collecting performance metrics for one or more applications running on the IT infrastructure; an anomaly detection engine analyzing the performance metrics and detecting anomalies, i.e. performance metrics whose values deviate from historic values with a deviation that exceeds a predefined threshold; a correlation engine detecting dependencies between plural anomalies, and generating anomaly clusters, each anomaly cluster consisting of anomalies that are correlated through one or more of the dependencies; a ranking engine ranking anomalies within an anomaly cluster; and a source detection
(Continued)

engine pinpointing a problem source from the lowest ranked anomaly in an anomaly cluster.

20 Claims, 3 Drawing Sheets

(51) Int. Cl.
    *G06F 11/34*     (2006.01)
    *G06F 11/07*     (2006.01)

(52) U.S. Cl.
    CPC ...... *G06F 11/0754* (2013.01); *G06F 11/3409* (2013.01); *G06F 11/3452* (2013.01); *G06N 20/00* (2019.01); *G06F 2201/865* (2013.01)

(56) References Cited

U.S. PATENT DOCUMENTS

| | | | |
|---|---|---|---|
| 8,738,582 | B2 | 5/2014 | De Schrijver et al. |
| 8,862,727 | B2 | 10/2014 | Jayachandran et al. |
| 8,862,728 | B2 * | 10/2014 | Jayachandran ..... G06F 11/0754 709/224 |
| 8,997,057 | B1 | 3/2015 | Diwan et al. |
| 9,092,616 | B2 | 7/2015 | Kumar et al. |
| 9,135,136 | B2 | 9/2015 | De Schrijver et al. |
| 9,392,026 | B2 | 7/2016 | Tien et al. |
| 9,589,229 | B2 | 3/2017 | Deng et al. |
| 9,846,629 | B2 | 12/2017 | De Schrijver et al. |
| 10,454,753 | B2 * | 10/2019 | Sasturkar .............. G06F 16/285 |
| 2005/0154769 | A1 | 7/2005 | Eckart et al. |
| 2006/0101308 | A1 | 5/2006 | Agarwal et al. |
| 2007/0101202 | A1 | 5/2007 | Garbow |
| 2008/0016412 | A1 | 1/2008 | White et al. |
| 2008/0235365 | A1 | 9/2008 | Bansal et al. |
| 2009/0157923 | A1 | 6/2009 | Puishys, Jr. et al. |
| 2010/0088410 | A1 | 4/2010 | Ridley |
| 2010/0091676 | A1 | 4/2010 | Moran et al. |
| 2013/0110761 | A1 * | 5/2013 | Viswanathan ......... G06N 20/00 706/52 |
| 2013/0305092 | A1 | 11/2013 | Jayachandran et al. |
| 2014/0229768 | A1 | 8/2014 | Bernstein et al. |
| 2015/0033086 | A1 * | 1/2015 | Sasturkar ................ G06F 16/26 714/57 |
| 2015/0085695 | A1 | 3/2015 | Ryckbosch et al. |
| 2015/0199226 | A1 | 7/2015 | Wu et al. |
| 2015/0355959 | A1 | 12/2015 | Kogan-Katz et al. |
| 2016/0217022 | A1 * | 7/2016 | Velipasaoglu ........ G06F 11/079 |
| 2016/0224898 | A1 * | 8/2016 | Ryckbosch ............ G06N 5/047 |
| 2017/0075749 | A1 * | 3/2017 | Ambichl ............. G06F 11/0748 |

OTHER PUBLICATIONS

"Application Performance Management", the World's Best Monitoring for Java, .NET, PHP, and Node.js Application, APPDynamics, http: //www. appdynamics. com:80/ product/application-performance-management/, Nov. 14, 2014, 11 Pages.

"Constantly Monitoring Your Application so You don't Have to", New Relic's SAAS-Based Application Performance Monitoring Helps you Build, Deploy, and Maintain Great Web Software, New Relic APM, http://www.newrelic.com/application-monitoring, Jan. 31, 2015, 11 Pages.

"How it Works", Getting Started with Boundary is easy as 1-2-3, Boundary, http://www.boundary.com/product/, Jan. 18, 2015, 9 Pages.

"K-Nearest Neighbors Algorithm", https://en.wikipedia.org/wiki/K-nearest_neighbors_algorithm, Downloaded on Dec. 12, 2014, 6 Pages.

ACM (DL) Digital Library Performance Anomaly Detection and Bottleneck Identification, Olumuyiwa Ibidunmoye, Francisco Hernandez-Rodriguez, Erik Elmroth Journal ACM Computing Surveys (CSUR) Surveys Homepage archive vol. 48 No. 1, Article 4, Jul. 2015, pp. 1-35.

An Online Performance Anomaly Detector in Cluster File Systems Xin Chen; Xubin He; He Guo; Yuxin Wang 2010 3rd International Symposium on Parallel Architectures, Algorithms and Programming Year: 2010 pp. 191-198 IEEE Conference Publications.

Applicant's Response to Examination Report from EP Application No. EP 15 153 477.3 including Amended Specification and Claims, Mar. 9, 2018.

Elsevier Journal of Network and Computer Applications vol. 60, Jan. 2016, pp. 19-31 a survey of network anomaly detection techniques Mohiuddin Ahmed, Abdun Naser Mahmood, Jiankun Hu.

Examination Report from EP Application No. EP 15 153 477.3, dated Jan. 11, 2018.

Exploring Time and Frequency Domains for Accurate and Automated Anomaly Detection in Cloud Computing Systems Qiang Guan; Song Fu; Nathan DeBardeleben; Sean Blanchard 2013 IEEE 19th Pacific Rim International Symposium on Dependable Computing Year: 2013 pp. 196-205 IEEE Conference Publications.

Extended European Search Report from Application No. 15153477.3, dated Jul. 6, 2015.

IEEE Network Anomaly Detection: Methods, Systems and Tools Monowar H. Bhuyan; D. K. Bhattacharyya; J. K. Kalita Published in: IEEE Communications Surveys & Tutorials ( vol. 16, Issue: 1, First Quarter 2014) pp. 303-336.

Occupancy forecasting for the reduction of HVAC energy consumption in smart buildings Enric Sala; Daniel Zurita; Konstantinos Kampouropoulos; Miguel Delgado; Luis Romeral IECON 2016—42nd Annual Conference of the IEEE Industrial Electronics Society Year: 2016 pp. 4002-4007 IEEE Conference Publications.

Visualization for Anomaly Detection and Data Management by Leveraging Network, Sensor and GIS Techniques Zhaoxia Wang; Chee Seng Chong; Rick Siow Mong Goh; Wanqing Zhou; Dan Peng; Hoong Chor Chin 2012 IEEE 18th International Conference on Parallel and Distributed Systems Year: 2012 pp. 907-912 IEEE Conference Publications.

United States Office Action, U.S. Appl. No. 15/010,121, dated Apr. 6, 2017, 22 pages.

United States Office Action, U.S. Appl. No. 15/010,121, dated May 22, 2018, 11 pages.

* cited by examiner

APPLICATION PERFORMANCE ANALYZER AND CORRESPONDING METHOD

CROSS REFERENCE TO RELATED APPLICATION

The application is a continuation of U.S. patent application Ser. No. 15/010,121, filed Jan. 29, 2016, which claims the benefit of European Patent Application No. 15153477.3, filed Feb. 2, 2015, each incorporated by reference in its entirety.

FIELD OF THE INVENTION

The present invention generally relates to application performance management or APM. APM systems target to analyze the performance of applications running on servers or other data center infrastructure, generally called information technology (IT) infrastructure throughout this patent application. An application may for instance be a web application, a backup process, database access, etc. The present invention in particular concerns improved application performance management with minimal impact on the server(s) or other IT infrastructure that is/are monitored.

BACKGROUND OF THE INVENTION

A first type of existing solutions for application performance management relies on deep inspection, i.e. at code level, of the processes that are running on monitored IT infrastructure. The inspection is done by an agent that is installed on the server or IT infrastructure that is monitored and that runs in the monitored applications. The agent for instance identifies individual queries of a database access application that are running slow.

The APM solution from New Relic relies on an agent that identifies performance impact of specific code segments or Structured Query Language (SQL) queries. The APM solution from New Relic is described, for example, in the description of application monitoring on New Relic's website: newrelic.com.

Also the APM solution from AppDynamics provides code level visibility into performance problems. Information on this APM solution is retrievable, for example, in the description of application performance management on AppDynamics's website: AppDynamics.com.

The agent that inspects the performance at code level in the just described first type of APM solutions uses substantial resources, i.e. CPU time, of the server or IT infrastructure that is monitored, and consequently negatively impacts the performance thereof.

Further, the agent based APM solutions enable only bottom-up analysis. The agent shall for instance detect that certain database queries are slow and shall report this. The slow database queries however may result from a back-up process that is running in parallel, but the agent will not be able to link the slow running queries to the back-up process. This can only be detected through manual inspection of data received from the agent(s).

A second type of existing solutions for application performance management relies on a lightweight agent installed on the server or IT infrastructure that is monitored. The lightweight agent does not run in the application that is monitored but reports server performance metrics at higher level, e.g. CPU usage, disk occupancy, memory usage, etc. An example of the second type of existing APM solutions is known from Boundary and is described, for example, in the products on Boundary's website: boundary.com.

A lightweight agent that does not run in the monitored application(s) has a smaller impact on resource usage of the monitored server or IT infrastructure. The lightweight agent however requires intelligence elsewhere to efficiently pinpoint the source of problems with minimal false alarms.

Existing solutions based on a lightweight agent, like for instance the one from Boundary, visualize the metrics obtained from the lightweight agent but pinpointing the source of problems remains a manual process.

A third type of existing solutions for application performance management works agentless. Agentless solutions do not impact resource usage of the monitored server(s) or IT infrastructure.

Agentless APM solutions however are less accurate, i.e. they generate more false alarms since no performance metrics obtained on the monitored server or IT infrastructure can be taken into account.

United States Patent Application US 2013/0110761 entitled "System and Method for Ranking Anomalies" describes an APM system wherein lightweight agents collect performance metrics, e.g. CPU idle time, and a central processor detects anomalies associated with one or plural data metrics. In order to tackle the problem of growing data centres and growing number of anomalies, the anomalies are ranked/categorized by severity or criticality.

Although the system known from US 2013/0110761 relies on lightweight agents that are non-intrusive for the servers and applications that are monitored, this system lacks the ability to identify the source of problems. Anomalies are ranked/prioritized to tackle the scalability problem, but the system known from US 2013/0110761 fails to exploit synergies or relations between detected anomalies.

United States Patent Application US 2008/0235365 entitled "Automatic Root Cause Analysis of Performance Problems Using Auto-Baselining on Aggregated Performance Metrics" describes a system for application performance monitoring with agents that report metrics, e.g. response time, error count, CPU load, and transaction identifiers or other transaction context data identifying execution paths and/or calling relationships between components of the system (see FIGS. 9: 900 and 925). The transaction information is used to correlate the performance metrics (see FIGS. 9: 905 and 930) in an attempt to deal with the scalability problem resulting from ever growing data centres and massive volumes of reported performance metrics resulting therefrom. Thereafter, anomalies are detected by comparing metrics to (adaptive) baselines and a drill down procedure is used to pinpoint the root cause and identify anomalous components of the system.

The approach followed in US 2008/0235365 is disadvantageous for two reasons. Firstly, the central manager in the system of US 2008/0235365 relies on transaction information, i.e. information that specifies the sequence of hosts called for each transaction, as is illustrated for instance by FIG. 3a-FIG. 3d in US 2008/0235365. Collecting and reporting such detailed information can only be done at application level, hence requiring agents on the hosts that are very intrusive in terms of impact on the performance of the servers or hosts that are monitored. Secondly, the correlation of massive volumes of performance metrics using massive volumes of transaction information is demanding on the central manager. The excessive information shared between the agents and the central manager in other words results in overhead, both at agent side and at central manager side.

SUMMARY OF THE INVENTION

It is an objective of the present invention to disclose a method and system for application performance analysis that resolves one or more of the above shortcomings of existing solutions. More particularly, it is an objective of the present invention to provide a method and system for application performance analysis that is able to pinpoint the source of problems without being intrusive and without generating excessive overhead.

According to the present invention, this objective is achieved and the above mentioned drawbacks and disadvantages of existing APM systems are overcome by an application performance analyzer, adapted to analyze the performance of one or more applications running on IT infrastructure, and comprising:
- a data collection engine adapted to collect performance metrics for the one or more applications running on the IT infrastructure;
- an anomaly detection engine adapted to analyze the performance metrics and to detect anomalies, i.e. performance metrics whose values deviate from historic values with a deviation that exceeds a predefined threshold;
- a correlation engine adapted to detect dependencies between plural anomalies, and to generate anomaly clusters, each anomaly cluster consisting of anomalies that are correlated through one or more of the dependencies;
- a ranking engine adapted to rank anomalies within an anomaly cluster; and
- a source detection engine adapted to pinpoint a problem source from the lowest ranked anomaly in an anomaly cluster.

Thus, the present invention concerns an application performance analyzer that collects performance metrics. The performance metrics, e.g. CPU usage, disk occupancy, memory usage, response time, etc., are obtained either from a lightweight agent installed on the server(s) that is/are monitored or alternatively they are obtained elsewhere, e.g. from a deep inspection monitoring system that runs in parallel and already has an agent installed on the servers. The application performance analyzer according to the invention anyhow does not comprise or install an intrusive agent itself. The received performance metrics are then analyzed to detect anomalies, e.g. deviations from past behavior. Thereupon, the anomalies are clustered, i.e. dependencies or relations between different anomalies are detected through analysis of for instance data communication paths. Alternatively or supplementary, predefined heuristics may be used instead of or in conjunction with communication path information in order to correlate anomalies. Interrelated anomalies that form part of a single cluster are then ranked. Again, data communication path information may be used to rank the anomalies in a single cluster. At last, the lowest ranked anomaly in a cluster is used to pinpoint the source of problems.

According to the present invention, dependencies between anomalies are detected and exploited to pinpoint the source of problems. Thereto, no agent or no additional agent is installed on the monitored IT infrastructure. Worst case, a lightweight agent is installed on the servers or nodes of the IT infrastructure that is monitored. The impact on the server(s) or IT infrastructure that is monitored hence remains small. Thanks to the fact that anomalies are detected first and only thereafter correlation techniques are applied, the present invention remains scalable. To correlate anomalies, no transaction information specifying each call between two hops is required. Anomalies can be correlated using limited information that is obtained at system level, such as for instance communication path information specifying no more than which servers or which applications are communicating with each other. No transaction identifiers or transaction context data generating tremendous overhead must be collected because no individual requests must be correlated.

According to an optional aspect of the application performance analyzer according to the present invention, the performance metrics comprise at least one of:
- CPU usage;
- disk space occupancy;
- memory usage;
- requests per second;
- response time; and
- error count value.

The skilled person will understand that the above list of performance metrics is not exhaustive, and variant embodiments of the application performance analyzer according to the present invention may rely on differing subsets of one or more of the above mentioned performance metrics. It is important to notice however that the application performance analyzer according to the present invention does not collect or require any information at code level for instance identifying code level instructions or queries that run slow.

Further optionally, in the application performance analyzer according to the present invention, the anomaly detection engine is adapted to apply the k-Nearest Neighbor algorithm or k-NN algorithm to detect the anomalies.

The skilled person however will appreciate that alternative algorithms that detect anomalies within a set of data, e.g. deviations from past behavior that exceed certain thresholds or baselines, may be applied in variant embodiments of the application performance manager according to the present invention.

In a preferred embodiment of the application performance analyzer according to the present invention, the data collection engine is further adapted to collect communication path data indicative for communication paths between nodes of the IT infrastructure.

Indeed, a preferred embodiment of the application performance analyzer is aware of communication flows between nodes at network level or system level. Knowledge of which server communicates with which other server(s) and/or knowledge of which application communicates with which other application(s) can be exploited by the application performance analyzer to correlate anomalies Such information, generally called communication path information, can be obtained without intruding the applications that are monitored and it is less exhaustive and voluminous than transaction information describing each transaction between two consecutive nodes or hops. Collecting communication path data in other words generates limited overhead whereas it enables to correlate anomalies which is essential in the anomaly clustering step of APM according to the present invention. As will be explained further below, the communication path information may also be exploited to rank the anomalies that form part of a single cluster in the anomaly ranking step of APM according to the present invention.

In accordance with a further optional aspect, the application performance analyzer according to the present invention further comprises:

a lightweight agent installed on one or more nodes of the IT infrastructure and configured to obtain the performance metrics and/or the communication path data, and to send the performance metrics and/or the communication path data to the data collection engine.

Indeed, as already mentioned here above, the present invention worst case relies on a lightweight agent installed on the monitored servers. Such lightweight agent is distinguishable from a full agent in that it does not run in the applications that are monitored and consequently also cannot identify lines of code, software instructions or queries whose performance is impacted and that for instance run slow. The lightweight agent runs parallel to the monitored applications and at best collects and reports generic performance metrics such as CPU usage, disk space occupancy or memory usage, and/or system level or network level communication path data. Application performance metrics such as requests per second, latencies, error rates, etc. are gathered from the application logs.

Further optionally, the correlation engine in the application performance analyzer according to the present invention is further adapted to cluster the anomalies based on the communication path data.

Thus, communication path data indicating which servers communicate with each other or indicating which applications communicate with each other, may be used by the correlation engine to correlate anomalies and create clusters of anomalies. Knowledge that two servers communicate with each other hence may be sufficient to correlate anomalies detected at these two servers. Similarly, knowledge that two applications communicate with each other may be sufficient to correlate anomalies detected in these two applications.

Further optionally, the ranking engine in the application performance analyzer according to the present invention may further be adapted to rank anomalies within an anomaly cluster based on the communication path information.

Thus, communication path data indicating which servers communicate with each other or indicating which applications communicate with each other, may also be used by the ranking engine to rank anomalies in a cluster of anomalies. Knowledge that two servers communicate with each other hence may be sufficient to rank anomalies detected at these two servers. The server that comes further in the communication path will be ranked lower than a server that comes earlier in the communication path. Similarly, knowledge that two applications communicate with each other may be sufficient to rank anomalies detected in these two applications. The application that comes further in the communication path will be ranked lower than an application that comes earlier in the communication path. The lowest ranked server or application, i.e. the server or application at the end of a communication path where a cluster of anomalies is detected, most probably is the source of the problem and will be identified as such through the application performance analyzer according to the present invention.

Alternatively or supplementary, the correlation engine in the application performance analyzer according to the present invention may be adapted to cluster the anomalies based on heuristics defining communication paths between nodes of the IT infrastructure or defining application insights of the one or more applications.

Instead of obtaining communication path data from a lightweight agent installed on the monitored servers or from an agent already running on such servers for different reasons, the communication path data may also be derived from heuristics giving insight into which applications or which servers communicate with each other. Such heuristics may for instance be manually entered.

In addition to an application performance analyzer, the present invention also relates to a corresponding method to analyze the performance of one or more applications running on IT infrastructure, the method comprising the steps of:
collecting performance metrics for the one or more applications running on the IT infrastructure;
analyzing the performance metrics and detecting anomalies, i.e. performance metrics whose values deviate from historic values with a deviation that exceeds a predefined threshold;
detecting dependencies between plural anomalies, and generating anomaly clusters, each anomaly cluster consisting of anomalies that are correlated through one or more of the dependencies;
ranking anomalies within an anomaly cluster; and
pinpointing a problem source from the lowest ranked anomaly in the anomaly cluster.

The present invention further also relates to a data processing system, comprising means for carrying out the method according to the invention, a computer program, comprising software code adapted to perform the method according to the invention; and a computer readable storage medium, comprising the computer program.

DETAILED DESCRIPTION OF EMBODIMENT(S)

Figure 1:
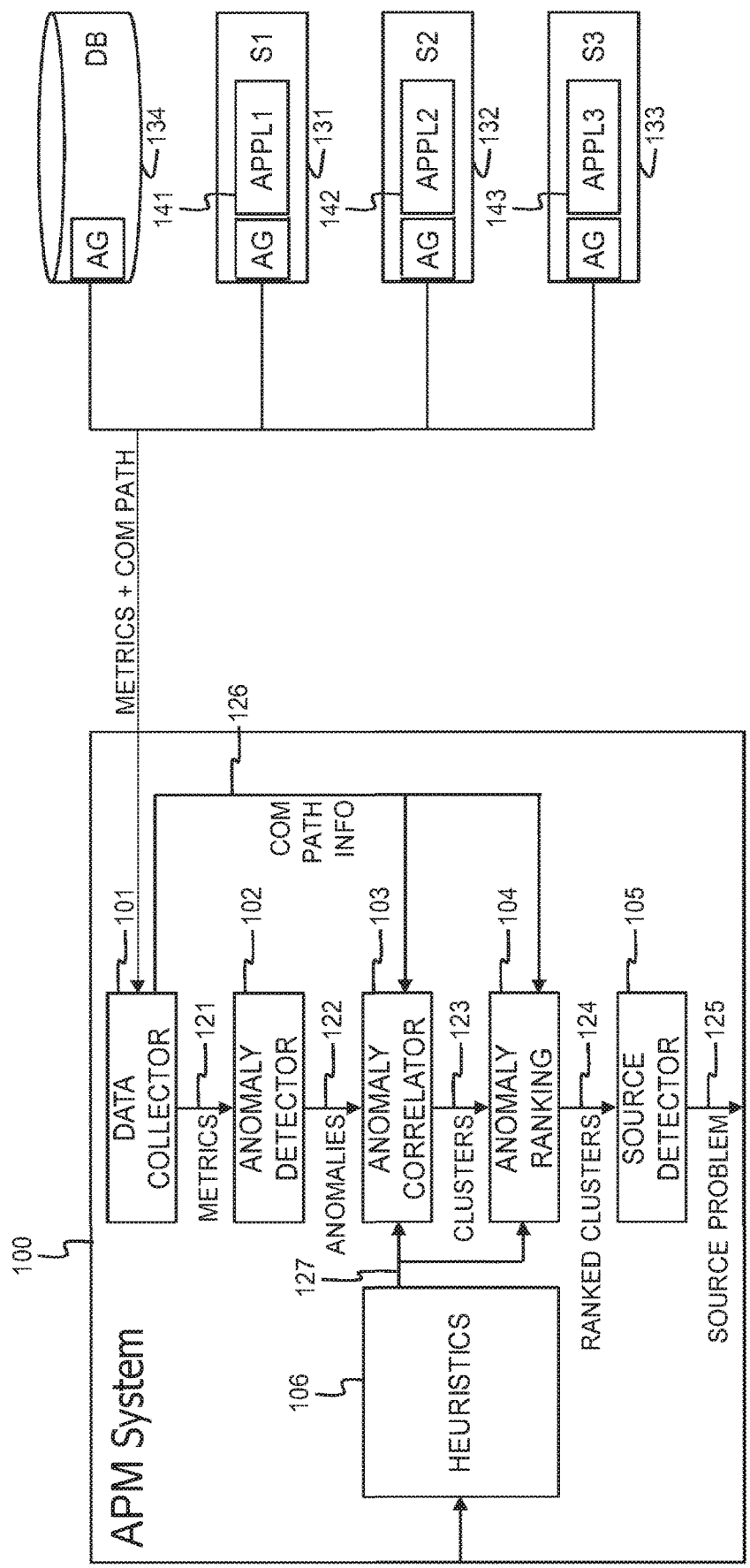
FIG. 1 is a functional block scheme of an embodiment of the application performance analyzer according to the present invention.

FIG. 1 shows a first server, S1 or 131, whereon a first application, APPL1 or 141 is running, a second server, S2 or 132, whereon a second application, APPL2 or 142 is running, and a third server, S3 or 133, whereon a third application, APPL3 or 143, is running. On each of the servers 131-133 a lightweight agent AG is installed. This lightweight agent AG collects performance metrics on the respective servers 131-133 and reports the collected performance metrics to a central application performance monitor or application performance management (APM) system 100, without interrupting the applications 141-143 or interfering with the applications 141-143. On the first server 131, the lightweight agent AG for instance periodically collects the percentage of processing capacity or CPU capacity in server 131 that is used by the first application 131, the percentage or volume of RAM in server 131 that is used by the first application 131, and the volume of disk space on server 131 that is occupied by the first application 131. These lightweight agent AG doesn't run in the first application 131 and does not interfere with the software code of the first application 131 when collecting these performance metrics. The collected performance metrics are periodically reported to the central application performance management system 100. The reporting may take place automatically, at regular time intervals, or alternatively may take place on request of the application performance management system 100. In a similar way, the lightweight agents AG installed on the second and third servers 132-133 collect and report performance metrics for the second and third applications 142-143 running on these servers. FIG. 1 further also shows a database server 134. Also on the database server, a lightweight agent AG is installed that monitors the CPU usage, RAM usage and disk occupancy for the database server 134, and that reports these performance metrics periodically to the application performance management system 100.

In addition to the collected performance metrics, the lightweight agents AG installed on the servers 131-134 also collect communication path data, i.e. data indicating which servers communicate with each other and/or data indicating which applications communicate with each other. The communication path data collected by the lightweight agents AG is also reported periodically to the application performance management system 100, i.e. either automatically at a fixed pace or on request of APM system 100.

The application performance management system 100 drawn in FIG. 1 comprises a data collector 101, an anomaly detector 102, an anomaly correlator 103, an anomaly ranking unit 104, a source problem detector 105, and a heuristics module 106. The data collector 101 collects the performance metrics from the lightweight agents AG installed on the different servers 131-134 as well as the communication path data. The performance metrics 121 are delivered to the anomaly detector 102. The communication path data 126 are delivered to the anomaly correlator 103 and the anomaly ranking unit 104.

The anomaly detector 102 analyses the performance metrics 121 and detects anomalies therein. An anomaly for instance corresponds to a value of a performance metric whose deviation from an historic average value calculated for that same performance metric exceeds a certain baseline or threshold. This baseline or threshold may be fixed or adaptive, i.e. the baseline(s) or threshold(s) used for detecting anomalies in reported performance metrics may be recalculated from time to time, e.g. at regular predetermined time intervals or each time new performance metric values are received from the lightweight agents. The anomaly detector 102 alternatively may apply more complex anomaly detection algorithms such as the k-Nearest Neighbour or k-NN algorithm to detect anomalies in the reported performance metrics. The anomalies 122 are thereafter reported to the anomaly correlator 103.

The anomaly correlator 103 uses the communication path data 126 to correlate anomalies 122. In addition to the communication path data 126, the anomaly correlator may also use heuristic information 127 specifying which servers and/or applications communicate with each other. This heuristic information 127 is collected by the heuristics module 106, for instance from the users of the application performance management system 100. Thus, knowledge on which servers communicate with each other and/or knowledge on which applications communicate with each other is exploited to find dependencies between anomalies that are detected for the different applications. Correlated anomalies form anomaly clusters 123 and these anomaly clusters 123 are delivered to the anomaly ranking unit 104.

The anomaly ranking unit 104 handles the anomaly clusters 123 one by one. Within each anomaly cluster, the anomalies are ranked. Thereto, the anomaly ranking unit 104 makes use of the communication path information 126 and/or the heuristic information 127. Information indicating for instance that the first application 141 running on the first server 131 sends information to the database server 134 is used by the anomaly ranking unit 104 to order an anomaly detected for a performance metric measured for the first application 141 higher than an anomaly nearly simultaneously detected at database server 134. Similarly source-destination communication path information is exploited to order the anomalies within each anomaly cluster 123 in such manner that anomalies detected close to the source of a communication path are ranked higher than anomalies that are detected closer to the destination of a communication path. The anomaly ranking unit 104 this way produces ranked anomaly clusters 124 that are delivered to the source problem detector 105.

The source problem detector 105 identifies within each ranked anomaly cluster 124 the lowest ranked anomaly and pinpoints the component, i.e. the server and or application whereat this lowest ranked anomaly is detected, as the source problem 125.

Figure 2:
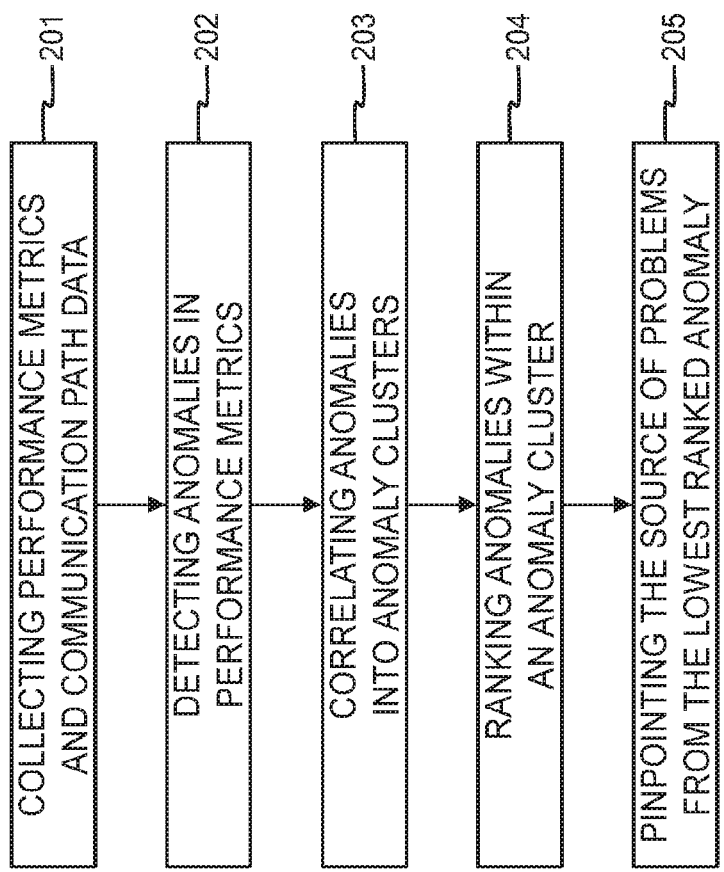
FIG. 2 is a flow diagram of the steps in an embodiment of the application performance analysis method according to the present invention.

FIG. 2 summarizes the different steps executed by the application performance management system 100 of FIG. 1. In a first step 201, performance metrics are collected from the servers whereon monitored applications are running Simultaneously, communication path data are collected. The communication path data can be collected from the servers whereon the monitored applications are running and/or they can be obtained from heuristics. In a second step 202, anomalies are detected in the collected performance metrics. This way, the volume of data that is further used to analyse the performance is substantially reduced. In a third step 203, the remaining anomalies are clustered into anomaly clusters. This is done using the communication path information. In a fourth step 204, the anomalies within a single cluster are ranked, again using the communication path information. This is done for each anomaly cluster. In a last, fifth step 205, the source problem underlying each anomaly cluster is pinpointed by identifying the lowest ranked anomaly in each ranked anomaly cluster and detecting the server and/or application where this lowest ranked anomaly comes from.

Figure 3:
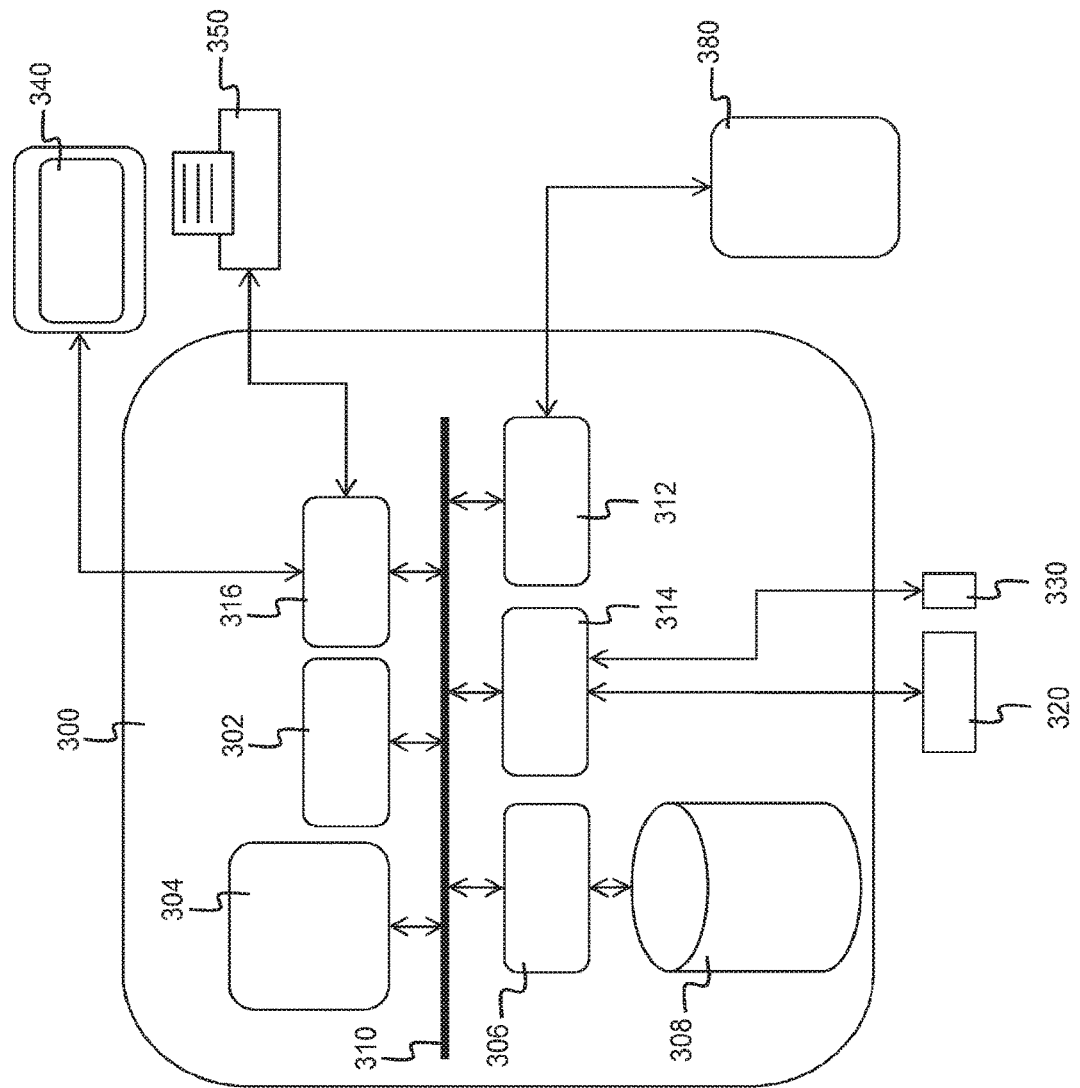
FIG. 3 illustrates a data processing system able to execute embodiments of the application performance analysis method according to the present invention.

FIG. 3 shows a suitable computing system 300 for hosting one or more components of the application performance management system 100 according to the invention. Computing system 300 may in general be formed as a suitable general purpose computer and comprise a bus 310, a processor 302, a local memory 304, one or more optional input interfaces 314, one or more optional output interfaces 316, a communication interface 312, a storage element interface 306 and one or more storage elements 308. Bus 310 may comprise one or more conductors that permit communication among the components of the computing system. Processor 302 may include any type of conventional processor or microprocessor that interprets and executes programming instructions. Local memory 304 may include a random access memory (RAM) or another type of dynamic storage device that stores information and instructions for execution by processor 302 and/or a read only memory (ROM) or another type of static storage device that stores static information and instructions for use by processor 302. Input interface 314 may comprise one or more conventional mechanisms that permit an operator to input information to the computing device 300, such as a keyboard 320, a mouse 330, a pen, voice recognition and/or biometric mechanisms, etc. Output interface 316 may comprise one or more conventional mechanisms that output information to the operator, such as a display 340, a printer 350, a speaker, etc. Communication interface 312 may comprise any transceiver-like mechanism such as for example two 1 Gb Ethernet interfaces that enables computing system 300 to communicate with other devices and/or systems, for example mechanisms for communicating with one or more other computing systems 380. The communication interface 312 of computing system 300 may be connected to such other computing system by means of a local area network (LAN) or a wide area network (WAN), such as for example the internet, in which case the other computing system 380 may for example comprise a suitable web server. Storage element interface 306 may comprise a storage interface such as for example a Serial Advanced Technology Attachment (SATA) interface or a Small Computer System Interface (SCSI) for connecting bus 310 to one or more storage elements 308, such as one or more local disks, for example SATA disk drives, and control the reading and writing of data to and/or from these storage elements 308. Although the storage element 308 above is described as a local disk, in general any other suitable computer-readable media such as a removable magnetic disk, optical storage media such as a CD or DVD, -ROM disk, solid state drives, flash memory cards, . . . could be used. The system 300 described above can also run as a Virtual Machine above the physical hardware.

The application performance management system 100 of FIG. 1 can be implemented as programming instructions stored in local memory 304 of the computing system 300 for execution by its processor 302. Alternatively the application performance management system 100 of FIG. 1 could be stored on the storage element 308 or be accessible from another computing system 380 through the communication interface 312.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

What is claimed is:

1. A system for identifying a problem source in an information technology (IT) infrastructure, comprising:
one or more processors configured to:
receive, from one or more agents of the IT infrastructure, performance metrics for applications running on the IT infrastructure, the one or more agents executing outside of the applications, the performance metrics excluding transaction information specifying calls between the applications;
detect anomalies using the performance metrics for the applications running on the IT infrastructure;
determine correlated anomalies based on communication path data indicating the correlated anomalies belong to a group of applications of the IT infrastructure that communicate with each other via a communication path;
generate a ranking of the correlated anomalies, a first correlated anomaly of a first application further in the communication path being ranked lower than a second correlated anomaly of a second application earlier in the communication path; and
identify an application of the group of applications as the problem source from a lowest ranked anomaly of the ranking of the correlated anomalies.

2. The system of claim 1, wherein the performance metrics comprise at least one of:
CPU usage;
disk space occupancy;
memory usage;
requests per second;
response time; or
error count value.

3. The system of claim 1, wherein the one or more processors configured to detect the anomalies includes the one or more processors being configured to apply a k-Nearest Neighbor algorithm or k-NN algorithm.

4. The system of claim 1, wherein the detected anomalies include performance metrics with values that deviate from historic values with a deviation that exceeds a predefined threshold.

5. The system of claim 1, wherein the one or more agents include a lightweight agent (AG) installed on a node of the IT infrastructure.

6. The system of claim 1, wherein the one or more processors are further configured to:
detect dependencies between the anomalies based on the communication path data; and
generate an anomaly cluster including the correlated anomalies based on the correlated anomalies being correlated through one or more of the dependencies.

7. The system of claim 1, wherein the one or more processors are configured to determine the correlated anomalies based on user input indicating the group of applications communicate with each other.

8. The system of claim 1, wherein the one or more processors are configured to determine the correlated anomalies based on user input indicating a group of servers that execute the group of applications communicate with each other.

9. The system of claim 1, wherein the problem source includes a server of the IT infrastructure that executes the application.

10. The system of claim 1, wherein the one or more processors are configured to determine the correlated anomalies based on the communication path data indicating a group of servers that execute the group of applications communicate with each other.

11. A method for identifying a problem source in an information technology (IT) infrastructure, comprising, by a computing system:
- receiving, from one or more agents of the IT infrastructure, performance metrics for applications running on the IT infrastructure, the one or more agents executing outside of the applications, the performance metrics excluding transaction information specifying calls between the applications;
- detecting anomalies using the performance metrics for the applications running on the IT infrastructure;
- determining correlated anomalies based on communication path data indicating the correlated anomalies belong to a group of applications of the IT infrastructure that communicate with each other via a communication path;
- generating a ranking of the correlated anomalies, a first correlated anomaly of a first application further in the communication path being ranked lower than a second correlated anomaly of a second application earlier in the communication path; and
- identifying an application of the group of applications as the problem source from a lowest ranked anomaly of the ranking of the correlated anomalies.

12. The method of claim 11, wherein the performance metrics comprise at least one of:
- CPU usage;
- disk space occupancy;
- memory usage;
- requests per second;
- response time; or
- error count value.

13. The method of claim 11, wherein detecting the anomalies includes applying a k-Nearest Neighbor algorithm or k-NN algorithm.

14. The method of claim 11, wherein the detected anomalies include performance metrics with values that deviate from historic values with a deviation that exceeds a predefined threshold.

15. The method of claim 11, wherein the one or more agents include a lightweight agent (AG) installed on a node of the IT infrastructure.

16. The method of claim 11, further comprising:
- detecting dependencies between the anomalies based on the communication path data; and
- generating an anomaly cluster including the correlated anomalies based on the correlated anomalies being correlated through one or more of the dependencies.

17. The method of claim 11, wherein the correlated anomalies are determined based on input indicating at least one of:
- the group of applications communicate with each other; or
- a group of servers that execute the group of applications communicate with each other.

18. The method of claim 11, wherein the problem source includes a server of the IT infrastructure that executes the application.

19. The method of claim 11, wherein the correlated anomalies are determined based on the communication path data indicating a group of servers that execute the group of applications communicate with each other.

20. A non-transitory computer readable storage medium having stored thereon executable instructions that when executed by one or more processors of a computer system configure the computer system to:
- receive, from one or more agents of an information technology (IT) infrastructure, performance metrics for applications running on the IT infrastructure, the one or more agents executing outside of the applications, the performance metrics excluding transaction information specifying calls between the applications;
- detect anomalies using the performance metrics for the applications running on the IT infrastructure;
- determine correlated anomalies based on communication path data indicating the correlated anomalies belong to a group of applications of the IT infrastructure that communicate with each other via a communication path;
- generate a ranking of the correlated anomalies, a first correlated anomaly of a first application further in the communication path being ranked lower than a second correlated anomaly of a second application earlier in the communication path; and
- identify an application of the group of applications as a problem source from a lowest ranked anomaly of the ranking of the correlated anomalies.

* * * * *

UNITED STATES PATENT AND TRADEMARK OFFICE
CERTIFICATE OF CORRECTION

PATENT NO. : 10,860,939 B2
APPLICATION NO. : 16/408345
DATED : December 8, 2020
INVENTOR(S) : Frederick Ryckbosch et al.

Page 1 of 1

It is certified that error appears in the above-identified patent and that said Letters Patent is hereby corrected as shown below:

In the Claims

In Column 12, in Claim 17, Lines 8, delete "anomalies are determined based on input indicating" and insert -- anomalies are determined based on user input indicating --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*